(12) United States Patent
Lee

(10) Patent No.: US 11,260,716 B2
(45) Date of Patent: Mar. 1, 2022

(54) ELECTRIC HEIGHT CONTROL DEVICE

(71) Applicant: HYUNDAI MOBIS CO., LTD., Seoul (KR)

(72) Inventor: Sang Moon Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/940,161

(22) Filed: Jul. 27, 2020

(65) Prior Publication Data

US 2021/0197638 A1    Jul. 1, 2021

(30) Foreign Application Priority Data

Dec. 26, 2019  (KR) .................. 10-2019-0175352

(51) Int. Cl.
*B60G 17/015*    (2006.01)

(52) U.S. Cl.
CPC .... *B60G 17/0152* (2013.01); *B60G 2202/413* (2013.01); *B60G 2204/4502* (2013.01); *B60G 2500/30* (2013.01); *B60G 2800/914* (2013.01)

(58) Field of Classification Search
CPC ............ B60G 17/0152; B60G 2500/30; B60G 2800/914; B60G 2202/413; B60G 2204/4502
See application file for complete search history.

(56) References Cited

U.S. PATENT DOCUMENTS

| | | | | |
|---|---|---|---|---|
| 5,288,102 | A * | 2/1994 | Machida ................ | B60G 15/12 267/64.16 |
| 8,641,052 | B2 * | 2/2014 | Kondo ................... | B60G 11/58 280/5.514 |
| 8,844,944 | B1 * | 9/2014 | Murakami ......... | B60G 17/0165 280/5.514 |
| 2014/0083093 | A1 * | 3/2014 | Murakami .............. | F15B 15/20 60/459 |
| 2015/0224845 | A1 * | 8/2015 | Anderson ............ | B60G 17/019 701/37 |
| 2020/0324610 | A1 * | 10/2020 | Conti .................... | B60G 13/08 |

* cited by examiner

*Primary Examiner* — Darlene P Condra
(74) *Attorney, Agent, or Firm* — DLA Piper LLP (US)

(57) ABSTRACT

An electric height control device may include: an oil storage part configured to store oil therein; a motor driving part inserted into the oil storage part and driven when power is applied thereto; a hydraulic block part coupled to the motor driving part, connected to the oil storage part, and configured to amplify oil; and a control part coupled to the hydraulic block part, and configured to control the motor driving part and the hydraulic block part.

10 Claims, 7 Drawing Sheets

1

ELECTRIC HEIGHT CONTROL DEVICE

CROSS-REFERENCE TO RELATED APPLICATION

This application claims priority from the benefit of Korean Patent Application No. 10-2019-0175352, filed on Dec. 26, 2019, which is hereby incorporated by reference for all purposes as if set forth herein.

BACKGROUND

Field

Exemplary embodiments of the present disclosure relate to an electric height control device, and more particularly, to an electric height control device whose individual components are integrated into one module to smoothly configure a mounting package and to reduce a development cost.

Discussion of the Background

In general, a suspension system refers to a system that relieves shock or vibration applied from the road during driving, thereby improving the ride quality and stability of a vehicle. The suspension system includes a chassis spring, a shock absorber for improving the ride quality by controlling the natural vibration of the chassis spring, and a stabilizer for preventing rolling of the vehicle.

The conventional suspension system of the vehicle is operated as follows. First, when an electronic control unit generates a control signal, a compressor compresses air and supplies the compressed air to a bellows-type air spring fixed to a vehicle body. The bellows-type air spring controls the height of the vehicle according to pneumatic pressure supplied by the compressor.

Since the height of the vehicle can be controlled through a hydraulic system, the hydraulic system requires a reservoir for storing oil to supply hydraulic pressure, an oil pump for generating hydraulic pressure, a power source for driving the oil pump, and valve blocks for operating a hydraulic circuit. The components are connected and operated through pipes for transferring hydraulic pressure and wiring lines for exchanging signals.

However, since the components of the hydraulic system are separately disposed, the hydraulic system has a problem in that it is difficult to install and connect the components in the vehicle with spatial constraints. Furthermore, such an installation structure is difficult to apply to other types of vehicles. Therefore, there is a need for a device capable of solving the problem.

SUMMARY

Various embodiments are directed to an electric height control device whose individual components are integrated into one module to smoothly configure a mounting package and to reduce a development cost.

In an embodiment, an electric height control device may include: an oil storage part configured to store oil therein; a motor driving part inserted into the oil storage part and driven when power is applied thereto; a hydraulic block part coupled to the motor driving part, connected to the oil storage part, and configured to amplify oil; and a control part coupled to the hydraulic block part, and configured to control the motor driving part and the hydraulic block part.

The oil storage part may include: a storage tank having an insertion hole into which the motor driving part is inserted; a storage inlet formed in the storage tank, and configured to receive oil injected thereto; a storage stopper configured to open/close the storage inlet; and a storage outlet formed in the storage tank, and configured to discharge oil to the hydraulic block part.

The storage outlet may include: a plurality of outlet pipe parts extended downward from the bottom surface of the storage tank, and configured to discharge oil; and an outlet sealing part configured to connect the outlet pipe part and the hydraulic block part so as to prevent oil leakage.

The storage outlet may further include: an outlet locking part protruding to the outside of the outlet pipe part; and an outlet insertion part formed in the outlet sealing part, such that the outlet locking part is inserted and locked to the outlet insertion part.

The oil storage part further include a storage buffer disposed between the storage tank and the motor driving part, and configured to absorb shock.

The hydraulic block part may include: a block body disposed between the control part and the motor driving part; a first flow path configured to guide oil supplied from the oil storage part; a first valve formed at an end of the first flow path, and configured to open/close the first flow path; a second flow path having one end connected to the first flow path and the other end connected to the first valve; a second valve formed in the second flow path, and configured to open/close the second flow path; a block pump formed in the second flow path disposed between the second valve and the first valve, and driven by the motor driving part; a third flow path having one end connected to the second flow path and the other end connected to a height control part; and a third valve configured to open/close the third flow path.

The electric height control device may further include a fixing part configured to fix the oil storage part and the hydraulic block part.

The fixing part may include: a fixed bracket part fixedly installed on a vehicle body; and a fixing coupling part configured to couple the fixed bracket part to any one or more of the oil storage part and the hydraulic block part.

The fixed bracket part may include: a first bracket part assembled to the vehicle body; a second bracket part extended from the first bracket part; and a third bracket part disposed between the oil storage part and the hydraulic block part in the second bracket part, and coupled to the fixing coupling part.

The fixing coupling part may include: a first coupling part disposed between the third bracket part and the hydraulic block part; a second coupling part disposed between the third bracket part and the storage coupling part formed in the oil storage part; a third coupling part coupled to the hydraulic block part through the first coupling part and the second coupling part; a fourth coupling part disposed between the hydraulic block part and the second bracket part; and a fifth coupling part coupled to the hydraulic block part through the fourth coupling part.

The electric height control device in accordance with the embodiment of the present disclosure can be modularized as the oil storage part, the motor driving part, the hydraulic block part and the control part are stacked vertically stacked, and fixedly installed on the vehicle body through the separate fixing part. Thus, the mounting package can be smoothly configured, and interchangeably applied regardless of the types of vehicles, which makes it possible to reduce the development cost.

Furthermore, the motor driving part can be inserted into the hole formed in the oil storage part, which makes it possible to reduce the volume of the module.

DETAILED DESCRIPTION OF THE ILLUSTRATED EMBODIMENTS

Hereinafter, an electric height control device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
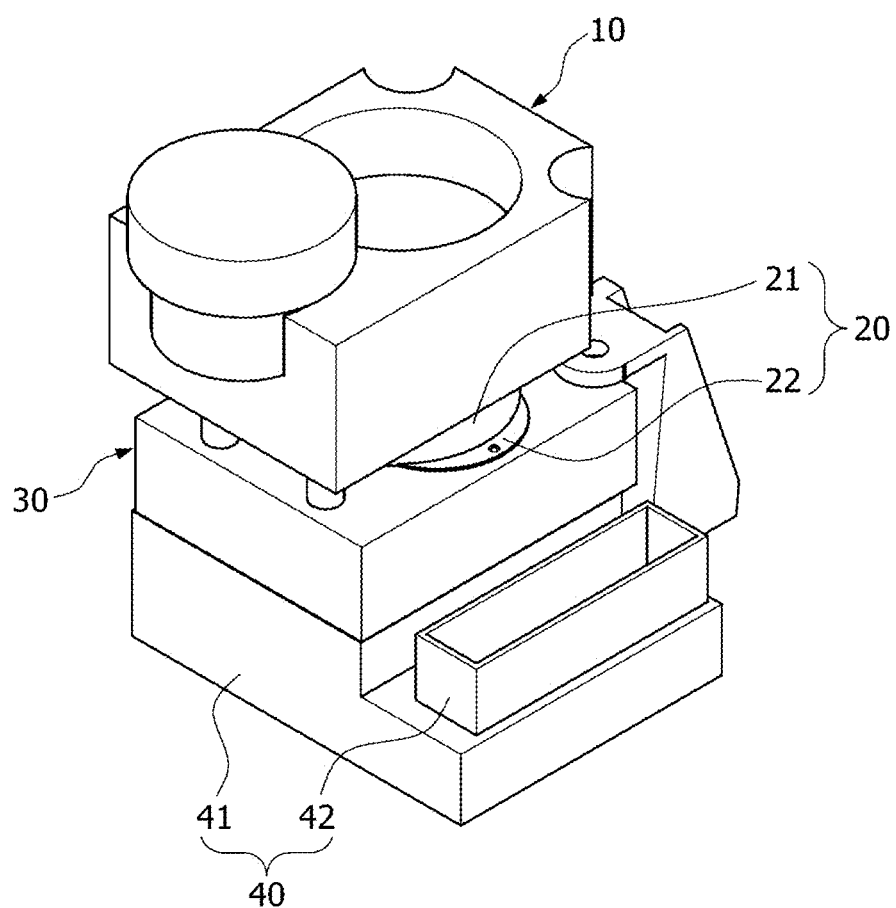
FIG. 1 is a diagram schematically illustrating an electric height control device in accordance with an embodiment of the present disclosure.

FIG. 1 is a diagram schematically illustrating an electric height control device in accordance with an embodiment of the present disclosure. Referring to FIG. 1, the electric height control device 1 in accordance with the embodiment of the present disclosure includes an oil storage part 10, a motor driving part 20, a hydraulic block part 30 and a control part 40. Such components are vertically stacked to become one module.

The oil storage part 10 forms a space in which oil is stored, and the motor driving part 20 is inserted into the oil storage part 10. The motor driving part 20 is driven when power is applied thereto. For example, a driving body 21 of the motor driving part 20 may be driven when power is applied, and inserted into the oil storage part 10 so as to reduce the volume of a module. Furthermore, a driving coupling part 22 extended in a lateral direction from the bottom of the driving body 21 may be seated on the top of the hydraulic block part 30, and screwed to the hydraulic block part 30.

The hydraulic block part 30 is coupled to the motor driving part 20, connected to the oil storage part 10, and serves to amplify oil. For example, the hydraulic block part 30 may have a flow path formed therein, and amplify hydraulic pressure through the motor driving part 20.

The control part 40 is coupled to the hydraulic block part 30, and controls the motor driving part 20 and the hydraulic block part 30. For example, the control part 40 may include a control housing 41 mounted on the bottom surface of the hydraulic block part 30 and a control connector 42 connected to the control housing 41 and a cable. The control housing 41 may be inserted into the hydraulic block part 30 so as to control a valve, and connected to the motor driving part 20 so as to apply power.

In accordance with the embodiment of the present disclosure, two electric height control devices 1 may be mounted in a vehicle, and provide hydraulic pressure to wheels divided into front wheels and rear wheels or left wheels and right wheels.

Figure 2:
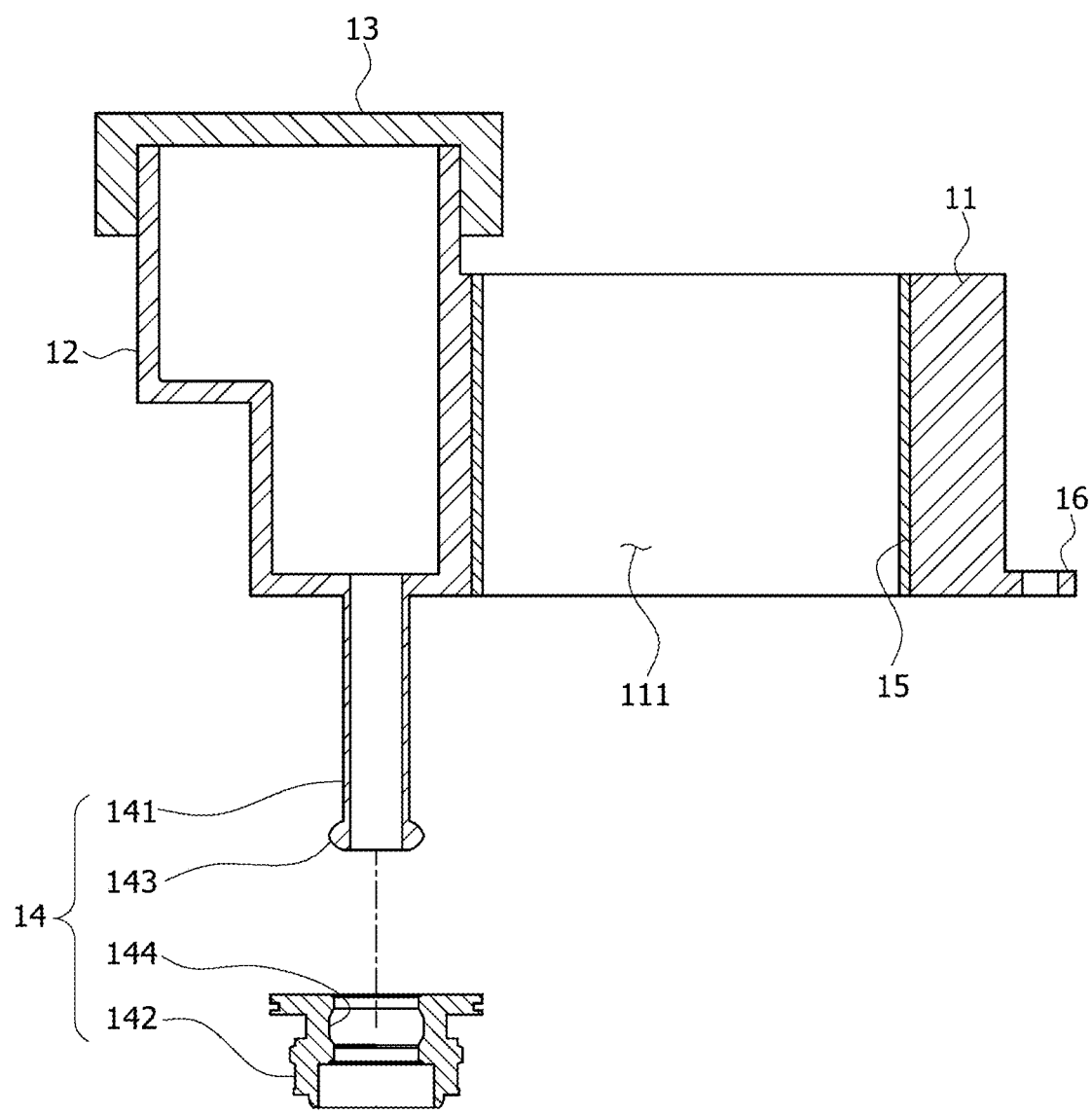
FIG. 2 is a cross-sectional view schematically illustrating an oil storage part in accordance with the embodiment of the present disclosure.

FIG. 2 is a cross-sectional view schematically illustrating the oil storage part in accordance with the embodiment of the present disclosure. Referring to FIG. 2, the oil storage part 10 in accordance with the embodiment of the present disclosure includes a storage tank 11, a storage inlet 12, a storage stopper 13 and a storage outlet 14.

The storage tank 11 has an insertion hole 111 into which the motor driving part 20 is inserted. For example, the storage tank 11 may be formed in the shape of a container for storing oil, and have a length and width corresponding to the hydraulic block part 30. Since the insertion hole 111 of the storage tank 11 is formed in the center thereof such that the motor driving part 20 is inserted into the insertion hole 111, the volume of the module can be reduced. The storage tank 11 may be formed of a transparent material through which the amount of oil can be recognized from the outside, and have a scale mark formed on the outside thereof.

The storage inlet 12 is formed in the storage tank 11, and oil is injected into the storage inlet 12. The storage stopper 13 serves to open/close the storage inlet 12. For example, the storage inlet 12 may be formed at the top of the storage tank 11, and a user may remove the storage stopper 13 and then supply oil to the storage inlet 12.

The storage outlet 14 is formed in the storage tank 11, and serves to discharge oil to the hydraulic block part 30. For example, the storage outlet 14 may be formed at the bottom surface of the storage tank 11. A plurality of storage outlets 14 are disposed to supply oil to independent hydraulic flow paths, respectively.

The storage outlet 14 in accordance with the embodiment of the present disclosure includes an outlet pipe part 141 and an outlet sealing part 142.

A plurality of outlet pipe parts 141 are extended downward from the bottom surface of the storage tank 11, and serve to discharge oil. For example, two outlet pipe parts 141 may be formed on the bottom surface of the storage tank 11 so as to be integrated with the storage tank 11, and have a pipe shape to guide oil.

The outlet sealing part 142 connects the outlet pipe part 141 to the hydraulic block part 30 so as to prevent oil leakage. For example, the outlet sealing part 142 may be inserted into a hole formed at the top of the hydraulic block part 30, and the outlet pipe part 141 may be inserted into the outlet sealing part 142. The outlet sealing part 142 may be formed of an elastic material, and the outlet pipe part 141 may be supported by the outlet sealing part 142 such that the storage tank 11 is fixed.

The storage outlet 14 in accordance with the embodiment of the present disclosure includes an outlet locking part 143 and an outlet insertion part 144.

The outlet locking part 143 protrudes to the outside of the outlet pipe part 141. For example, the outlet locking part 143 may protrude along the outer circumferential surface of the outlet pipe part 141.

The outlet insertion part 144 is formed in the outlet sealing part 142, and the outlet locking part 143 is inserted and locked to the outlet insertion part 144. For example, the outlet insertion part 144 may be formed in a groove shape in the outlet sealing part 142 or protrude to the outside of the outlet sealing part 142, and the outlet locking part 143 may be locked and fixed to the outlet insertion part 144.

The oil storage part 10 in accordance with the embodiment of the present disclosure may further include a storage buffer 15. The storage buffer 15 is disposed between the storage tank 11 and the motor driving part 20, and serves to absorb shock. For example, the storage buffer 15 may be formed of an elastic material, and attached to the inside of the storage tank 11 having the insertion hole 111 formed therein or attached to the outside of the motor driving part 20 so as to remove vibration noise.

The oil storage part 10 in accordance with the embodiment of the present disclosure may further include a storage coupling part 16. A pair of storage coupling parts 16 may protrude in one direction of the storage tank 11. For example, the storage outlet 14 may be disposed on the opposite side of the storage coupling part 16.

Figure 3:
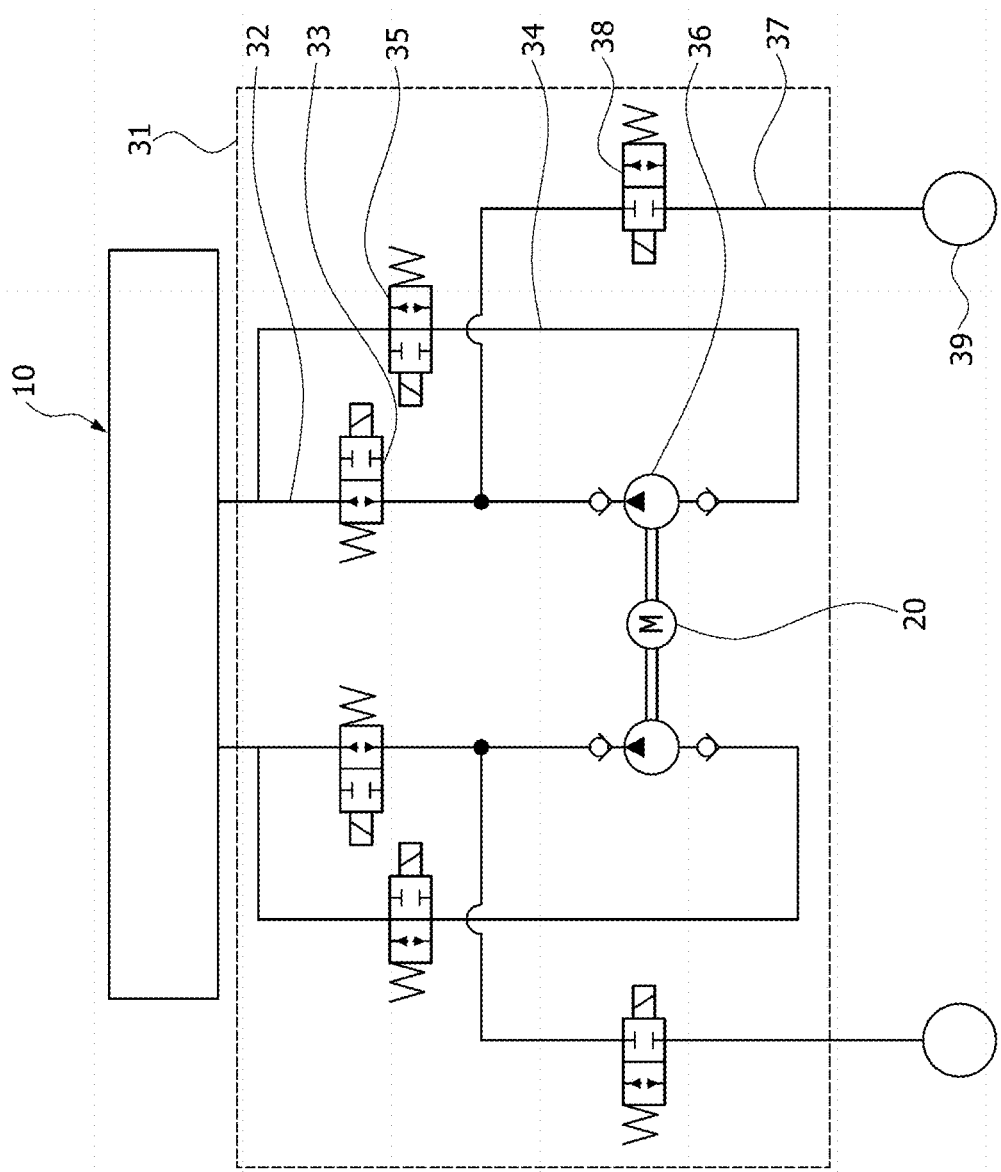
FIG. 3 is a hydraulic circuit diagram schematically illustrating a hydraulic block part in accordance with the embodiment of the present disclosure.

FIG. 3 is a circuit diagram schematically illustrating the hydraulic block part in accordance with the embodiment of the present disclosure. Referring to FIG. 3, the hydraulic block part 30 in accordance with the embodiment of the present disclosure includes a block body 31, a first flow path 32, a first valve 33, a second flow path 34, a second valve 35, a block pump 36, a third flow path 37 and a third valve 38.

The block body 31 is disposed between the control part 40 and the motor driving part 20. For example, the block body 31 may be formed in a hexahedron shape, and have a flow path through which oil flows.

The first flow path 32 guides oil supplied from the oil storage part 10. For example, the outlet sealing part 142 may be forced into each of the two first flow paths 32, and the storage outlet 14 may be connected to the outlet sealing part 142 such that oil can be moved.

The first valve 33 is formed at an end of the first flow path 32, and serves to open/close the first flow path 32. For example, the first valve 33 may be a solenoid valve for opening/closing the first flow path 32 according to whether power is applied from the control part 40.

The second flow path 34 has one end connected to the first flow path 32, and the other end connected to the first valve 33. The second valve 35 is formed in the second flow path 34, and serves to open/close the second flow path 34. For example, the second valve 35 may be a solenoid valve for opening/closing the second flow path 34 according to whether power is applied from the control part 40.

The block pump 36 is formed in the second flow path 34 disposed between the second valve 35 and the first valve 33, and driven by the motor driving part 20. For example, the block pump 36 may generate hydraulic pressure through eccentric shaft rotation of the motor driving part 20. The hydraulic pressure generated by the block pump 36 may move oil toward the first valve 33.

The third flow path 37 has one end connected to the second flow path 34 and the other end connected to a height control part 39. For example, the third flow path 37 may be connected to the second flow path 34 disposed between the block pump 36 and the first valve 33. The height control part 39 may be an actuator which is mounted on each wheel and whose length can be controlled by hydraulic pressure so as to control the height of the vehicle body.

The third valve 38 serves to open/close the third flow path 37. For example, the third valve 38 may be a solenoid valve for opening/closing the second flow path 34 according to whether power is applied from the control part 40.

Figure 4:
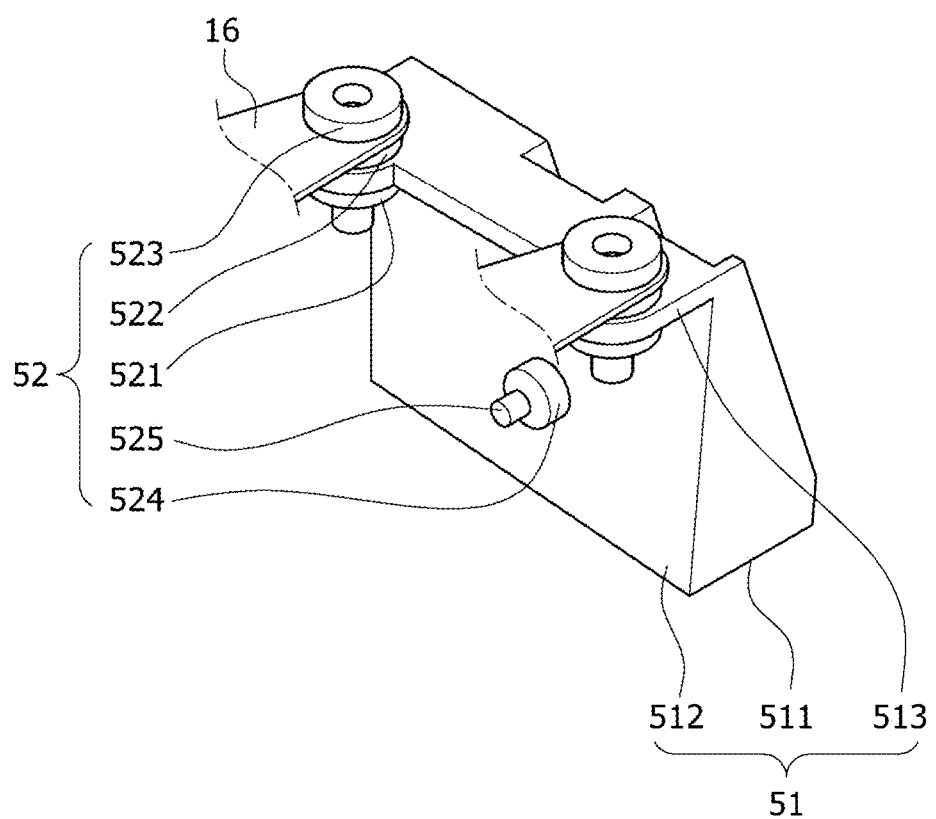
FIG. 4 is a diagram schematically illustrating a fixing part in accordance with the embodiment of the present disclosure.

FIG. 4 is a diagram schematically illustrating a fixing part in accordance with the embodiment of the present disclosure. Referring to FIG. 4, the electric height control device 1 in accordance with the embodiment of the present disclosure may further include a fixing part 50.

The fixing part 50 in accordance with the embodiment of the present disclosure fixes the oil storage part 10 and the hydraulic block part 30. For example, the fixing part 50 may be coupled to the vehicle body, and support the oil storage part 10 and the hydraulic block part 30.

More specifically, the fixing part 50 may include a fixed bracket part 51 which is fixedly installed to the vehicle body and a fixing coupling part 52 which couples the fixed bracket part 51 to the oil storage part 10 and the hydraulic block part 30.

The fixed bracket part 51 in accordance with the embodiment of the present disclosure includes a first bracket part 511, a second bracket part 512 and a third bracket part 513.

The first bracket part 511 is assembled to the vehicle body. For example, the first bracket part 511 may be formed in a shape corresponding to a mounting surface of the vehicle body, and brought in surface contact with the mounting surface and coupled through a bolt.

The second bracket part 512 is extended from the first bracket part 511. For example, the second bracket part 512 may be connected to the first bracket part 511, and formed higher than the control part 40 and the hydraulic block part 30 which are stacked.

The third bracket part 513 is disposed between the oil storage part 10 and the hydraulic block part 30 in the second bracket part 512, and coupled to the fixing coupling part 52. For example, the third bracket part 513 may be extended in a lateral direction from an end of the second bracket part 512, and disposed between the oil storage part 10 and the hydraulic block part 30.

The fixing coupling part 52 in accordance with the embodiment of the present disclosure includes a first coupling part 521, a second coupling part 522, a third coupling part 523, a fourth coupling part 524 and a fifth coupling part 525.

The first coupling part 521 is disposed between the third bracket part 513 and the hydraulic block part 30. For example, the first coupling part 521 may be formed of an elastic material, and seated on the top of the hydraulic block part 30 so as to support the third bracket part 513.

The second coupling part 522 is disposed between the third bracket part 513 and the storage coupling part 16 formed in the oil storage part 10. For example, the second coupling part 522 may be formed of an elastic material, and seated on the top of the third bracket part 513 so as to support the storage coupling part 16.

The third coupling part 523 is coupled to the hydraulic block part 30 through the first coupling part 521 and the second coupling part 522. For example, the third coupling part 523 may be a bolt which is sequentially passed through the storage coupling part 16, the second coupling part 522, the third bracket part 513 and the first coupling part 521, and screwed to the top of the hydraulic block part 30.

The fourth coupling part 524 is disposed between the hydraulic block part 30 and the second bracket part 512. For example, the fourth coupling part 524 may be formed of an elastic material, and support the hydraulic block part 30.

The fifth coupling part 525 is coupled to the hydraulic block part 30 through the fourth coupling part 524. For example, the fifth coupling part 525 may be a bolt which is sequentially passed through the second bracket part 512 and the fourth coupling part 524 and screwed to a side surface of the hydraulic block part 30.

An assembling process of the electric height control device in accordance with the embodiment of the present disclosure, which has the aforementioned configuration, will be described as follows.

The motor driving part 20 is inserted into the oil storage part 10, such that the bottom surface of the motor driving part 20 is seated on the top of the hydraulic block part 30. Then, the motor driving part 20 and the hydraulic block part 30 are coupled to each other through a bolt. The control part 40 is placed close to the bottom surface of the hydraulic block part 30, and the hydraulic block part 30 and the control part 40 are coupled to each other through a bolt.

The control part 40 may be connected to the hydraulic block part 30 so as to control various valves of the hydraulic block part 30, and the motor driving part 20 may be inserted into the hydraulic block part 30 so as to drive the pump.

At this time, the motor driving part 20 may be inserted into the insertion hole 111 formed in the storage tank 11, and thus reduce the entire volume of the module. The outlet pipe part 141 formed in the storage tank 11 is supported by the outlet sealing part 142 forced into the hydraulic block part 30, and blocks oil leakage while maintaining the fixed state of the storage tank 11.

The fixed bracket part 51 is fixedly installed on the vehicle body, and the fixing coupling part 52 fixes the module by coupling the fixed bracket part 51 to any one or more of the oil storage part 10 and the hydraulic block part 30.

Therefore, since the oil storage part 10, the motor driving part 20, the hydraulic block part 30 and the control part 40 become one integrated module, a separate hydraulic line or wiring line installation work may be omitted. Furthermore, as the fixing part 50 fixes the modularized part to the vehicle body, the modularized part may be applied to various types of vehicles.

Figure 5:
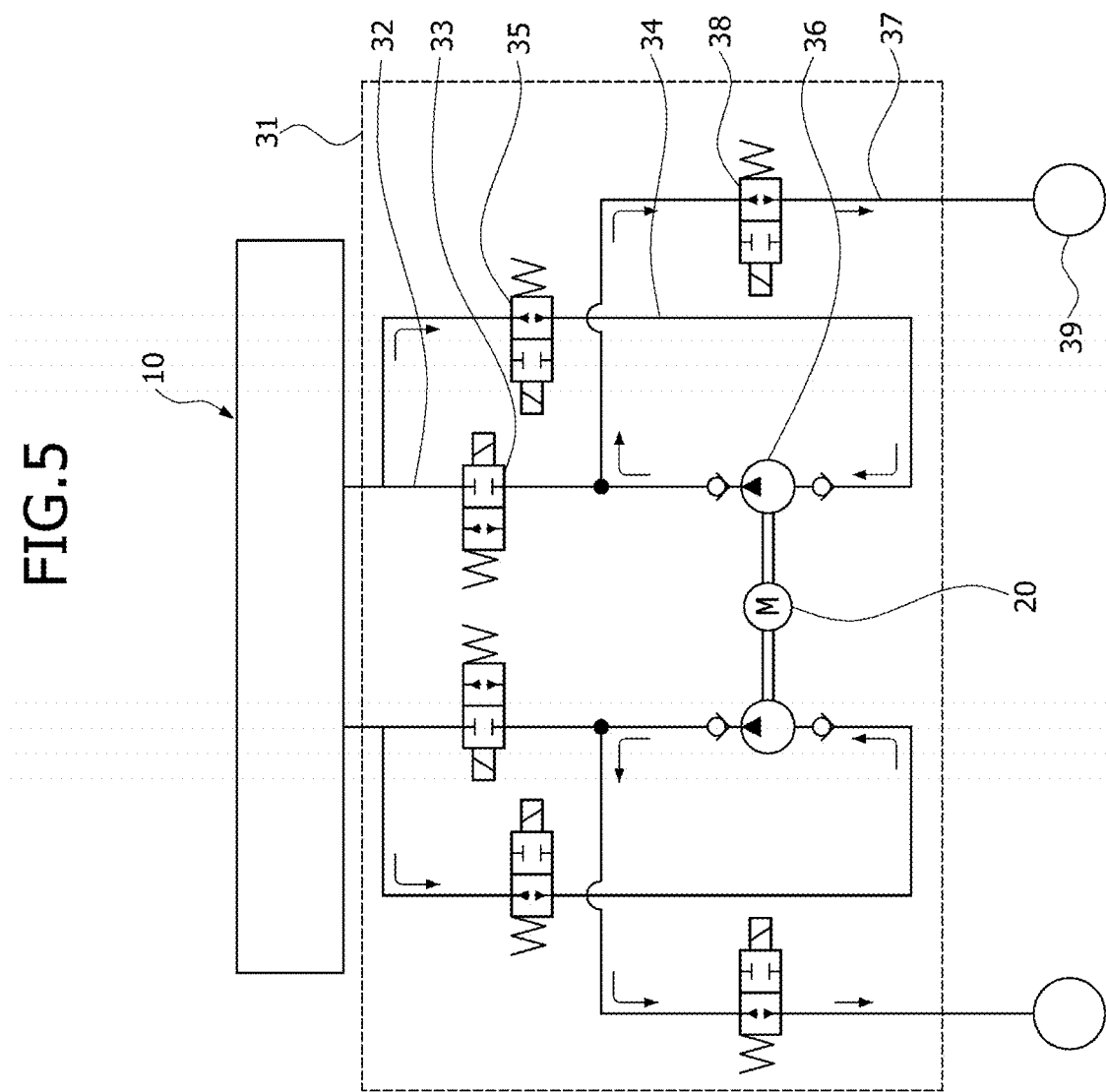
FIG. 5 is a diagram schematically illustrating that a vehicle height is increased in FIG. 3.

FIG. 5 is a diagram schematically illustrating that a vehicle height is increased in FIG. 3. Referring to FIG. 5, the first valve 33 closes the first flow path 32, the second valve 35 opens the second flow path 34, and the third valve 38 opens the third flow path 37.

In the above-described state, when the motor driving part 20 is operated to drive the block pump 36, oil supplied from the oil storage part 10 is supplied to the block pump 36 through the second flow path 34, and hydraulic pressure is amplified and then supplied to the height control part 39 through the third flow path 37, thereby increasing the vehicle height.

Figure 6:
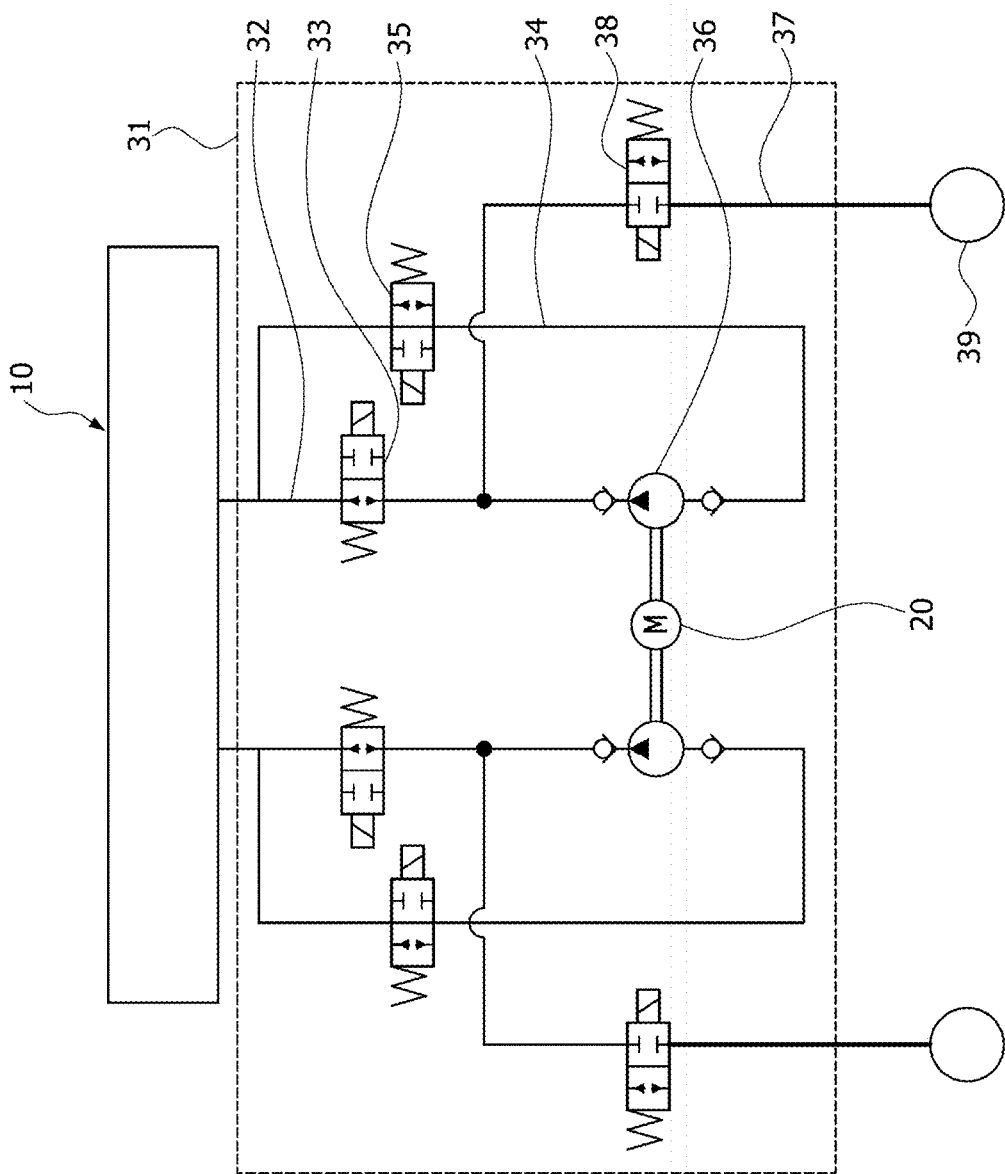
FIG. 6 is a diagram schematically illustrating that the vehicle height is maintained in FIG. 3.

FIG. 6 is a diagram schematically illustrating that the vehicle height is maintained in FIG. 3. Referring to FIG. 6, the third valve 38 closes the third flow path 37. Thus, the hydraulic pressure supplied to the height control part 39 may be retained to maintain the vehicle height. At this time, since a normal closed valve is applied as the third valve 38, the vehicle height can be maintained even in an engine off state where no power is supplied.

Figure 7:
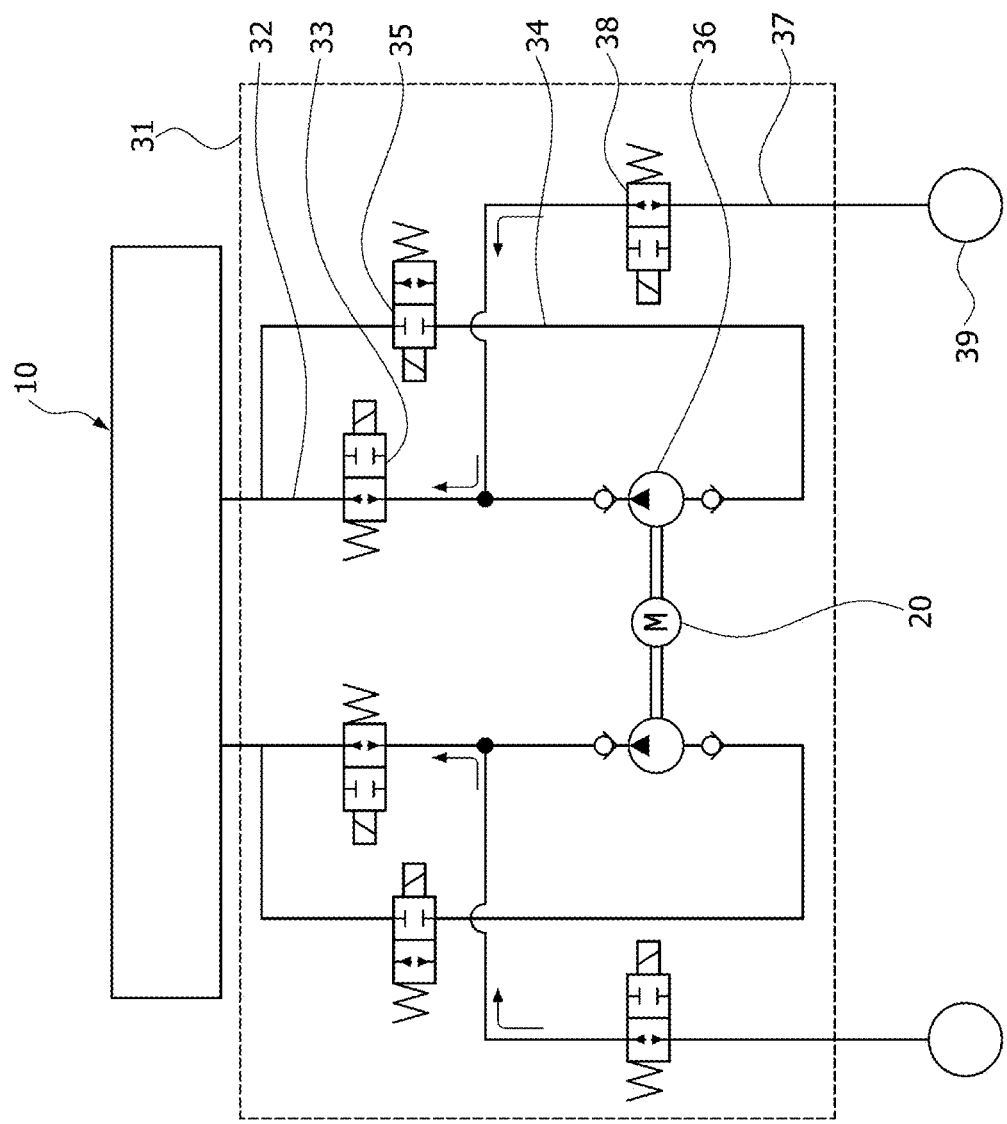
FIG. 7 is a diagram schematically illustrating that the vehicle height is decreased in FIG. 3.

FIG. 7 is a diagram schematically illustrating that the vehicle height is decreased in FIG. 3. Referring to FIG. 7, the first valve 33 opens the first flow path 32, the second valve 35 closes the second flow path 34, and the third valve 38 opens the third flow path 37. The block pump 36 is stopped.

In the above-described state, the vehicle height is decreased as oil supplied to the height control part 39 is moved to the oil storage part 10 through the third flow path 37 and the first flow path 32. At this time, the speed at which the vehicle height is decreased may be controlled by adjusting the opening degree of the first valve 33.

The electric height control device 1 in accordance with the embodiment of the present disclosure can be modularized as the oil storage part 10, the motor driving part 20, the hydraulic block part 30 and the control part 40 are stacked vertically stacked, and fixedly installed on the vehicle body through the separate fixing part 50. Thus, the mounting package can be smoothly configured, and interchangeably applied regardless of the types of vehicles, which makes it possible to reduce the development cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electric height control device comprising:
    an oil storage part configured to store oil therein;
    a motor driving part inserted into the oil storage part and driven when power is applied thereto;
    a hydraulic block part coupled to the motor driving part, connected to the oil storage part, and configured to amplify oil; and
    a control part coupled to the hydraulic block part, and configured to control the motor driving part and the hydraulic block part.

2. The electric height control device of claim 1, wherein the oil storage part comprises:
    a storage tank having an insertion hole into which the motor driving part is inserted;
    a storage inlet formed in the storage tank, and configured to receive oil injected thereto;
    a storage stopper configured to open/close the storage inlet; and
    a storage outlet formed in the storage tank, and configured to discharge oil to the hydraulic block part.

3. The electric height control device of claim 2, wherein the storage outlet comprises:
    a plurality of outlet pipe parts extended downward from the bottom surface of the storage tank, and configured to discharge oil; and
    an outlet sealing part configured to connect one outlet pipe part of the plurality of outlet pipe parts and the hydraulic block part so as to prevent oil leakage.

4. The electric height control device of claim 3, wherein the storage outlet further comprises:
    an outlet locking part protruding to the outside of one outlet pipe part of the plurality of outlet pipe parts; and
    an outlet insertion part formed in the outlet sealing part, such that the outlet locking part is inserted and locked to the outlet insertion part.

5. The electric height control device of claim 2, wherein the oil storage part further comprises a storage buffer disposed between the storage tank and the motor driving part, and configured to absorb shock.

6. The electric height control device of claim 1, wherein the hydraulic block part comprises:
    a block body disposed between the control part and the motor driving part;
    a first flow path configured to guide oil supplied from the oil storage part;
    a first valve formed at an end of the first flow path, and configured to open/close the first flow path;

a second flow path having one end connected to the first flow path and the other end connected to the first valve;

a second valve formed in the second flow path, and configured to open/close the second flow path;

a block pump formed in the second flow path disposed between the second valve and the first valve, and driven by the motor driving part;

a third flow path having one end connected to the second flow path and the other end connected to a height control part; and a third valve configured to open/close the third flow path.

7. The electric height control device of claim 1, further comprising a fixing part configured to fix the oil storage part and the hydraulic block part.

8. The electric height control device of claim 7, wherein the fixing part comprises:

a fixed bracket part fixedly installed on a vehicle body; and a fixing coupling part configured to couple the fixed bracket part to any one or more of the oil storage part and the hydraulic block part.

9. The electric height control device of claim 8, wherein the fixed bracket part comprises:

a first bracket part assembled to the vehicle body;

a second bracket part extended from the first bracket part; and a third bracket part disposed between the oil storage part and the hydraulic block part in the second bracket part, and coupled to the fixing coupling part.

10. The electric height control device of claim 9, wherein the fixing coupling part comprises:

a first coupling part disposed between the third bracket part and the hydraulic block part;

a second coupling part disposed between the third bracket part and a storage coupling part formed in the oil storage part;

a third coupling part coupled to the hydraulic block part through the first coupling part and the second coupling part;

a fourth coupling part disposed between the hydraulic block part and the second bracket part; and a fifth coupling part coupled to the hydraulic block part through the fourth coupling part.

* * * * *